R. S. HILL.

DEVICE FOR MUSICAL INSTRUCTION.

No. 7,640.

Reissued April 24, 1877.

WITNESSES

Robert Everett

George E. Ubram

INVENTOR.

Russell S. Hill.

G. Ellmore & Smith & Co.

ATTORNEYS.

UNITED STATES PATENT OFFICE.

RUSSELL S. HILL, OF IPAVA, ILLINOIS.

IMPROVEMENT IN DEVICES FOR MUSICAL INSTRUCTION.

Specification forming part of Letters Patent No. 185,532, dated December 19, 1876; reissue No. 7,640, dated April 24, 1877; application filed April 14, 1877.

*To all whom it may concern:*

Be it known that I, RUSSELL S. HILL, of Ipava, in the county of Fulton and State of Illinois, (late of Industry, in the county of McDonough and State of Illinois,) have invented a new and valuable Improvement in Device for Use in Teaching Music, Reading, Arithmetic, &c.; and I do hereby declare that the following is a full, clear, and exact description of the construction and operation of the same, reference being had to the annexed drawings, making a part of this specification, and to the letters and figures of reference marked thereon.

Figure 1:
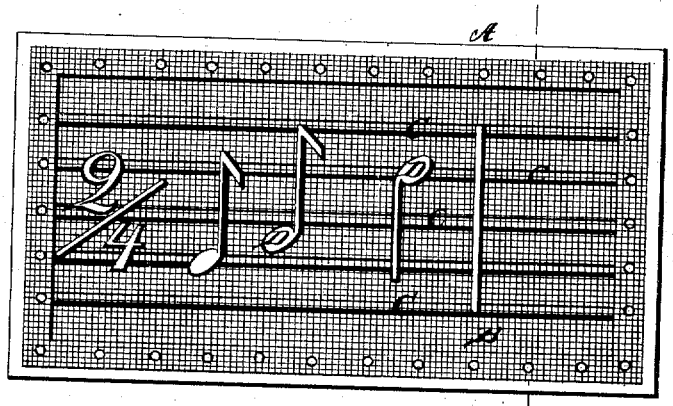
Figure 2:
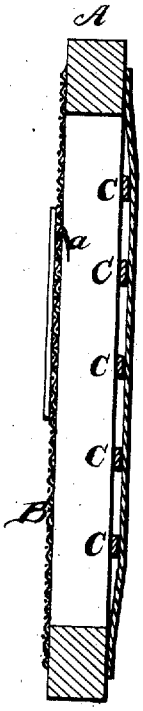
Figure 3:
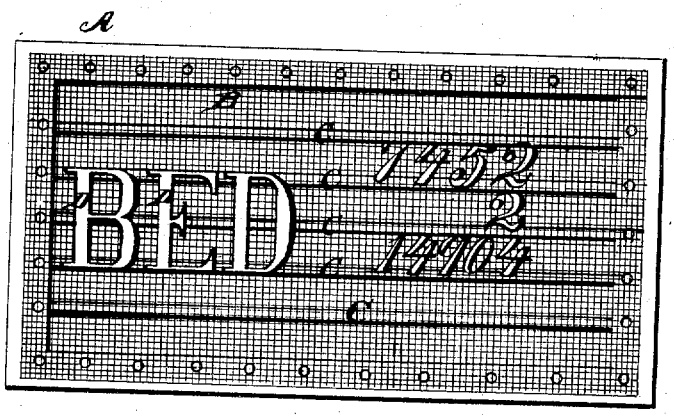

Figure 1 of the drawings is a representation of a front elevation of my improved scale. Fig. 2 is a section on line *x x*. Fig. 3 is a front view of my device as applied to alphabetical and arithmetical uses.

My invention consists of a board, frame, or other device, with a strip of woven wire, or other equivalent substance, of dark color, nailed or otherwise fastened on a little in advance of a series of light lines, together with movable blocks or plates representing notes, letters, figures, sentences, and other characters, or having such affixed to them, to be used in teaching, as will be hereinafter more fully set forth.

In the annexed drawing, which fully illustrates my invention, A represents a frame of any desired kind and dimensions; or it may be a board with the middle portion recessed a little, on which is a strip or piece, B, of woven reticulated fabric, mounted in front of horizontal strips C. These strips C should be of lighter color than the fabric B, so that they can be seen through said fabric and represent lines thereon.

D D represent thin blocks or plates of wood, or other suitable light material, provided with hooks, pins, or other devices *a*, adapted to readily attach said blocks or plates to the fabric B, at any desired place thereon. The plates D must remain wherever placed on the fabric, and will not require adjustment; and the fabric being perforated, there is a place always ready for the attaching device *a*, so that no pressure is required to cause the plates to stick. Hence a person can manipulate them with great rapidity.

These plates D may be made in any desired form to represent notes, letters, figures, or any other characters or devices; or they may have such notes, letters, and even sentences, figures, characters, or devices affixed to them in any desired or suitable manner.

This invention is intended for use in teaching in place of the ordinary blackboard. It possesses all the advantages of the blackboard, while it is more speedy, accurate, attractive, and easily handled than the crayon and blackboard, and can be used by persons not accustomed to drawing.

In teaching music the plates representing or showing the notes can be moved up and down as a sound will rise and fall. The teacher can direct the attention to one of these notes, and sing a tone that it is supposed to represent, at the same time changing the tone either up or down, and changing the note to correspond.

The teacher can also build the scale as he sings, placing each note as it is sounded, making the spaces wide or narrow, according to the major or minor intervals between the tones.

The apparatus is also to be used in the transposition of the scale for representing to the eye the transposition of the tone by the voice. In the diatonic scale the interval between the tones is greater in some places than others, and the intervals between the absolute tones of the staff (named by letters) come in the same way, and vary with different letters on which the scale starts, requiring corresponding modification of the scale, which can be readily accomplished by this device. Without this representation to the eye of the movable note, representing the sharping or flatting of tones affecting the intervals in the transposition of the scale, it is very hard for young minds to grasp the principle at all.

A whole apparatus can be made in that way, letting the wires cross the lines or strips C perpendicularly, with the plates placed on them above and below, to be moved onto any line or space desired.

In the same manner the apparatus is used for object-teaching, spelling, constructing sentences, setting copies, figuring or ciphering, and other purposes in teaching the young.

What I claim as new, and desire to secure by Letters Patent, is—

The frame A, having reticulated fabric B, and strips C, in combination with suspended blocks or plates D, substantially as and for the purpose herein set forth.

In testimony that I claim the above I have hereunto subscribed my name in the presence of two witnesses.

RUSSELL STONE HILL.

Witnesses:
A. B. MORSE,
E. CARTER.